US006829986B2

(12) United States Patent
Richter

(10) Patent No.: US 6,829,986 B2
(45) Date of Patent: Dec. 14, 2004

(54) COMPACTOR

(75) Inventor: Wolfgang Richter, Tirschenreuth (DE)

(73) Assignee: Hamm AG, Tirschenreuth (DE)

( * ) Notice: Subject to any disclaimer, the term of this patent is extended or adjusted under 35 U.S.C. 154(b) by 35 days.

(21) Appl. No.: 10/432,902

(22) PCT Filed: Nov. 27, 2001

(86) PCT No.: PCT/EP01/13806

§ 371 (c)(1),
(2), (4) Date: May 29, 2003

(87) PCT Pub. No.: WO02/44475

PCT Pub. Date: Jun. 6, 2002

(65) Prior Publication Data

US 2004/0028472 A1 Feb. 12, 2004

(30) Foreign Application Priority Data

Nov. 29, 2000 (DE) ........................................ 100 59 245

(51) Int. Cl.[7] .......................... B30B 3/00; E01C 19/38; F16H 33/00

(52) U.S. Cl. .................. 100/155 R; 404/117; 404/122; 74/61; 74/87; 73/594; 492/15; 172/40

(58) Field of Search .............................. 100/155 R, 99, 100/100; 404/117, 122, 130; 74/61, 86, 87; 73/570, 593, 594; 492/15, 16; 172/40, 54

(56) References Cited

U.S. PATENT DOCUMENTS 3,897,165 A * 7/1975 Vural ........................ 404/117
3,909,147 A * 9/1975 Takata ........................ 404/117
4,749,305 A * 6/1988 Brown et al. ............... 404/117
5,248,216 A * 9/1993 Vural .......................... 404/75
5,934,824 A * 8/1999 Vural ........................ 404/117

FOREIGN PATENT DOCUMENTS

DE 298 05 361 U1 7/1998
EP 0 053 598 A 6/1982
EP 0 530 546 A 3/1993

* cited by examiner

*Primary Examiner*—Allen Ostrager
*Assistant Examiner*—Jimmy Nguyen
(74) *Attorney, Agent, or Firm*—Diller, Ramik & Wight

(57) ABSTRACT

In a compressor comprising at least one traveling drum (4,4*a*,4*b*) rotatable about a drum axis (2), and an oscillation exciter supported in the drum (4,4*a*, 4*b*), the angular position of the oscillation exciter being adjustable by an adjustable pivoting angle relative to a vertical plane which extends through the drum axis (2), it is provided that the oscillation exciter comprises a pendulum-type vibrator (10) having a pendulum-type housing (8) which pivots about a pivoting axis extending coaxially to the drum axis (2) and includes a single unbalance exciter shaft (12) supported at a radial parallel distance to the drum axis (2) in the pendulum-type housing (8), wherein the pendulum-type vibrator (10) generates an elliptical drum oscillation.

13 Claims, 3 Drawing Sheets

COMPACTOR

BACKGROUND OF THE INVENTION

The invention relates to a compactor comprising at least one oscillating drum.

A generic compactor is known from EP 0 530 546 A. The known compactor comprises at least one traveling drum which is operatively connected with unbalance exciter shafts of an oscillation exciter, the shafts being arranged in parallel to the drum axis and rotating synchronously, such that the roller optionally applies a mainly dynamical shearing or pressure load to the ground.

A similar solution is known from DE 298 05 361 U.

The oscillation is generated by at least two exciter shafts with unbalance weights rotating in opposite directions. This results in a directed oscillation whose direction of action can be pivoted from a horizontal into a vertical direction. The amplitude of the roller drum remains constant such that only the direction of oscillation is changed.

Further, oscillation generation by means of circular vibrators is known. Here, the unbalance weights are preferably located on an axis in the center of the drum and generate a circulating force. If two unbalance weights rotating in the same direction are used, whose phases are adjustable relative to each other, the amount of the resultant compacting force can be changed by changing the phase position. Another parameter for adaptation to the operating conditions is the variation of the oscillation frequency.

A method for measuring mechanical data of a ground and for adjusting the roller parameters, based on the mentioned mechanical solution concerning adaptation of compacting force and frequency is known from WO 98/17865.

Proceeding from an oscillating drum with a circular vibrator whose amplitude and frequency are infinitely adjustable, the applicant dealt with automatic adaptation of the roller parameters traveling velocity, amplitude and frequency to the respective operating conditions. This type of amplitude and frequency adjustment is very complicated with regard to the configuration. The same applies to the adjustment of the direction of action of the oscillations in the aforementioned vibrators with unbalance weights rotating in opposite directions as described in EP 0 530 546 A and DE 29 805 361 U because here at least two exciter shafts are be used whose movements of rotation must be coordinated relative to each other.

Under comparable conditions, circular vibrators attain higher compaction values than the directed oscillation of vibrators with unbalance weights rotating in opposite directions. The directed oscillation of said vibrators generates pressure forces in the ground which act in one direction only and thus allow compaction by displacement of different layers of the subsoil to be compacted only to limited extent. If this direction of action of the oscillation is pivoted from a vertical into a horizontal direction, e.g. to reduce the oscillation transmitted to buildings, the shearing stress which can be transmitted to the subsoil becomes very small.

When applying the compaction method described in EP 0 053 598, compaction can optionally be carried out by using an oscillation effective in the depth according to the circular vibrator principle or using an oscillating drum movement generated by torques, said drum movement primarily producing shearing stresses in the subsoil. Like the adjustable vibrator with unbalance weights rotating in opposite directions, the oscillating drum movement reduces the oscillation stresses of the machine and the surroundings, but attains higher compaction values as compared with the vibrator with unbalance weights rotating in opposite directions. The method includes two exciter shafts synchronously rotating in the same direction of rotation and with a 180° phase shift. Thus the oppositely directed forces generated by the exciter shafts and acting upon the drum are compensated. A torque about the drum axis acting upon the drum is generated. These torques with alternating signs lead to the oscillating movement of the drum, and a shearing stress with a comparably higher depth effect occurs in the subsoil. If a higher depth effect is required, the phase shift is reduced from 180° to 0° such that the effect of a circular vibrator is attained. An essential drawback of this concept is that the configuration does not allow infinite adjustment of the amplitude without the occurrence of undefined oscillation conditions. Another drawback is the high configurative expenditure.

SUMMARY OF THE INVENTION

It is an object of the invention to simplify a compactor of the aforementioned type with regard to its mechanical configuration, and to allow generation of an oscillation movement which optimizes introduction of a force into the material to be compacted to permit rapid compaction.

The invention advantageously provides that the oscillation exciter comprises a pendulum-type vibrator for generating elliptic oscillations of the drum, said vibrator having a pendulum-type housing oscillating about the drum axis and including a single unbalance exciter shaft supported in the pendulum-type housing at a radial distance to the drum axis and in parallel to the drum axis.

The use of a pendulum-type vibrator combines the advantages of the simple configuration of a circular vibrator and the adjustment capabilities of a directed vibrator with unbalance weights rotating in opposite directions as well as the advantages with regard to compaction of an oscillating drum movement. The unbalance weight rotating on the exciter shaft generates circulating forces. Since the exciter shaft is supported in a pendulum-type housing such that it is pivotable about the drum axis, only little forces are transmitted outside the direction of the longitudinal axis of the pendulum. The force components of the unbalance weights extending at an angle relative to the longitudinal axis of the pendulum generate a momentum about the drum axis acting upon the pendulum-type housing, and thus effect an excursion of the pendulum. Due to the high frequency of the unbalance weight and the mass inertia of the pendulum-type housing the angle of the pendulum movement can be kept small.

The pendular oscillations of the pendulum-type housing result in a generally elliptic form of oscillation of the drum.

The pendulum-type housing is preferably supported via rolling bearings on the inside of the drum radially on the drum. The radial support can be effected on the radially outer circumference portion of the pendulum-type housing or at corresponding radial housing steps of the pendulum-type housing at the axial side faces. The radial rolling bearings transmit the oscillations of the pendulum-type housing to the drum.

The angular position of the longitudinal axis of the pendulum-type vibrator relative to a vertical plane extending through the drum axis is adjustable with the aid of an adjusting means. Thus the orientation of the elliptic oscillation relative to a vertical plane extending through the drum axis is adjustable by e.g. ±90°. Between the adjusting means for adjusting the angular position of the pendulum-type vibrator and the pendulum-type housing a damping element allowing and limiting pendulum oscillations is arranged. The damping element serves as coupling element between an adjusting lever of the adjusting means and the oscillating pendulum-type housing. The adjusting lever presets the angular position of the longitudinal axis of the pendulum-type vibrator, wherein the damping element allows an oscillation of the pendulum-type housing about said angular position to a certain extent.

The longitudinal axis of the pendulum-type housing lies in a plane defined by the drive shaft of the pendulum-type vibrator and the unbalance shaft.

The elliptic form of oscillation generated by the oscillation drive is variable on the one hand via the angular position of the pendulum-type housing and on the other hand via the speed of the unbalance exciter shaft. Thus the direction of the elliptic oscillation and its intensity can be adjusted.

The drive shaft of the pendulum-type vibrator is arranged coaxially to the drum axis, wherein the drive shaft is supported in the pendulum-type housing.

The drive shaft for the pendulum-type vibrator is coupled via an intermediate gear with the unbalance exciter shaft. The intermediate gear may comprise a belt drive.

Alternatively, the unbalance exciter shaft can be adapted to be directly electrically or hydrostatically driven. In this case the intermediate gear and the drive shaft of the pendulum-type vibrator may be omitted, which reduces the configurative expenditure.

In one embodiment it is provided that, in axial direction, two drums are arranged side by side and comprise a common pendulum-type vibrator. The two drums may be provided with independent drum drives.

BRIEF DESCRIPTION OF THE DRAWINGS

Hereunder embodiments of the invention are explained in detail with reference to the drawings in which.

DESCRIPTION OF THE PREFERRED EMBODIMENTS

Figure 1:
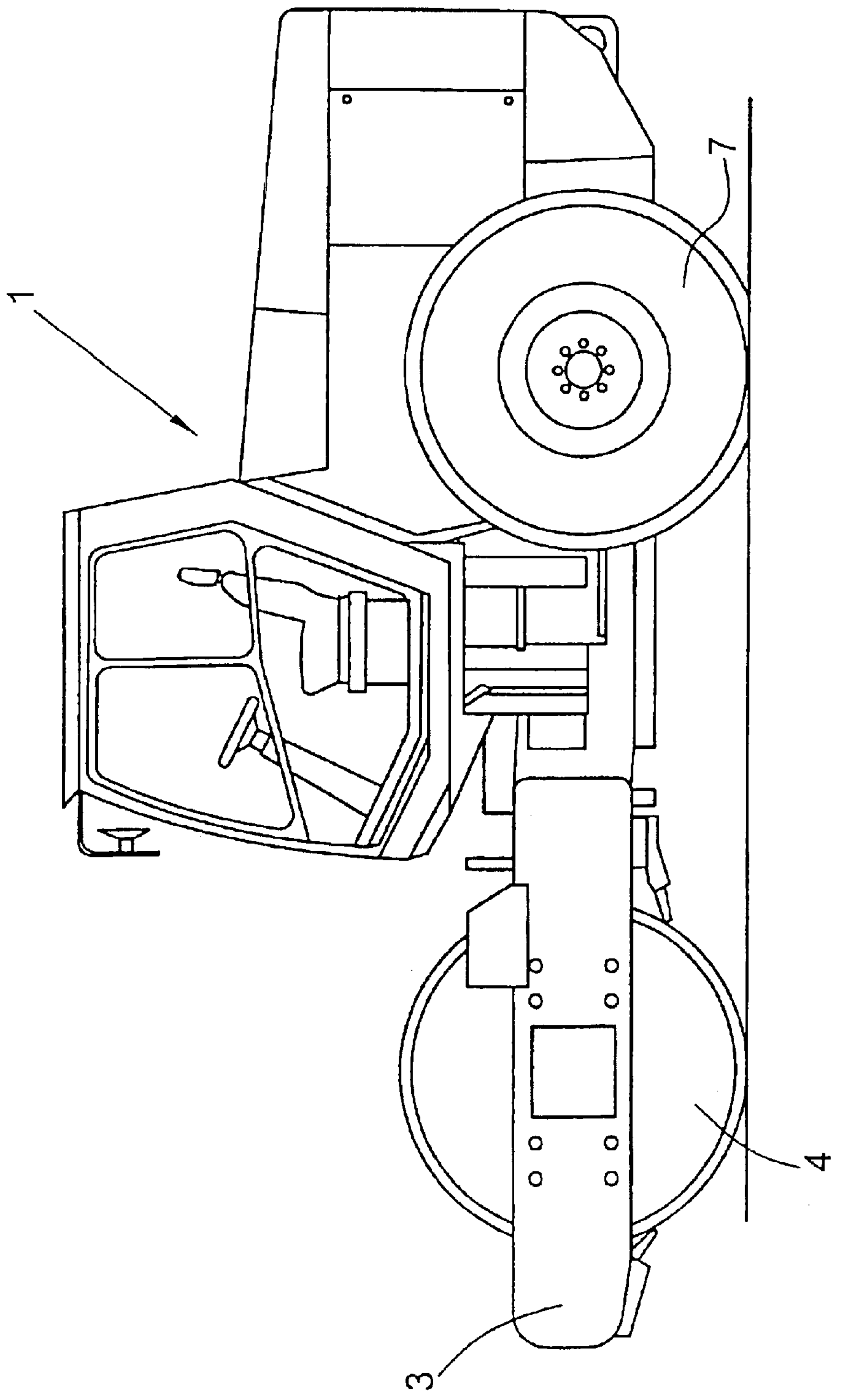
FIG. 1 shows a road roller with a drum according to the invention.

FIG. 1 shows a road roller 1 comprising a chassis 3, a wheel drive having two rear wheels 7 and a front drum 4.

Figure 2:
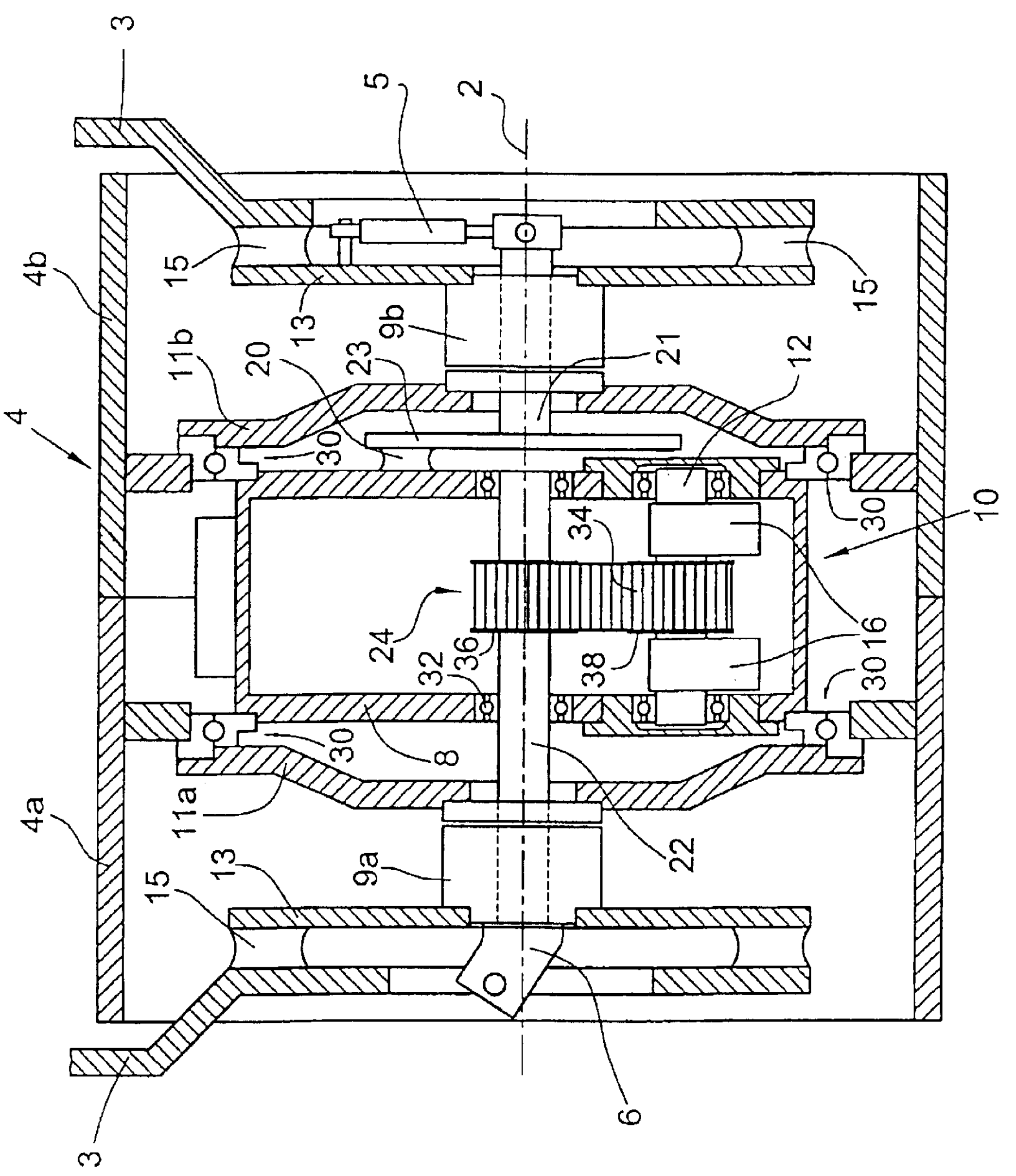
FIG. 2 shows a cross-sectional view of the drum with internal pendulum-type vibrator.

FIG. 2 shows a cross-sectional view of the drum 4, wherein the embodiment represents a split drum 4 comprising two drum sections 4_a_,4_b_. Each drum section 4_a_,4_b_ may be provided with its own drum drive 9_a_,9_b_, said drum drives allowing a relative movement of the two drum sections during the steering operation.

The connecting flange 13, to which the drum drive 9_a_,9_b_ is fastened, is elastically connected via rubber elements 15 to the machine frame 3.

The drum drives 9_a_,9_b_ are fastened to a connecting flange 13 at the vehicle chassis 3 and drive the drum sections 4_a_,4_b_ via a respective inner flange 11_a_, 11_b_.

The drum 4 accommodates in its interior a pendulum-type vibrator 10 which is driven by a drive shaft 22 extending coaxially to the drum axis 2 through the drum drive 9_a_. The drive shaft 22 is connected with an oscillation drive 6.

The pendulum-type vibrator 10 essentially comprises a pendulum-type housing 8 which includes a single unbalance exciter shaft 12 supported in the pendulum-type housing 8. The unbalance exciter shaft 12 is provided with unbalance weights 16 fixedly fastened to the unbalance exciter shaft 12.

The drive shaft 22 is connected with the unbalance exciter shaft 12 via an intermediate gear arranged in the pendulum-type housing 8 and comprising e.g. a belt drive 24. The belt drive 24 may comprise a toothed belt 34 which circulates via toothed wheels 36,38 on the drive shaft 22 and/or the unbalance exciter shaft 12 to transmit the driving energy to the unbalance exciter shaft 12. Since synchronous running of the weights is not required, V-belts may also be used.

In the embodiment shown in FIG. 2 the pendulum-type housing 8 is pivotable about a pivoting axis which is coaxial to the drum axis 2.

In the embodiment shown in FIG. 2 the pendulum-type housing 8 is radially supported via rolling bearings 30 arranged on its outer circumference on the drum sections 4_a_,4_b_. The drive shaft 22 for the pendulum-type vibrator 10 is, in turn, supported via rolling bearings 32 in the pendulum-type housing 8.

As an alternative to the embodiment shown, the oscillation drive 6 can directly drive the unbalance exciter shaft 12, wherein the oscillation drive 6 may comprise an electromotor or a hydromotor. If a direct drive is used, the drive shaft 22 and the intermediate drive comprising a belt drive 24 and arranged between the drive shaft 22 and the unbalance exciter shaft 12 are omitted.

An adjusting means 5, which preferably comprises a piston-and-cylinder unit, is fastened to one end of the the chassis element 13 and actuates an adjusting lever which is not shown in FIG. 2 since it is hidden by the shaft 21 and with the aid of which the shaft 21, which extends through the drum drive 9_b_, is rotatable. The shaft 21 is connected with an adjusting lever 23 which is connected, at its radial end, via at least one damping element 20 with the pendulum-type housing 8. The adjusting lever 23 may also comprise a disk at whose outer circumference a plurality of damping elements 20 are coupled with the pendulum-type housing 8. With the aid of the adjusting means 5 the pendulum-type vibrator 10 is thus adjustable relative to a vertical plane extending through the drum axis 2.

Figure 3:
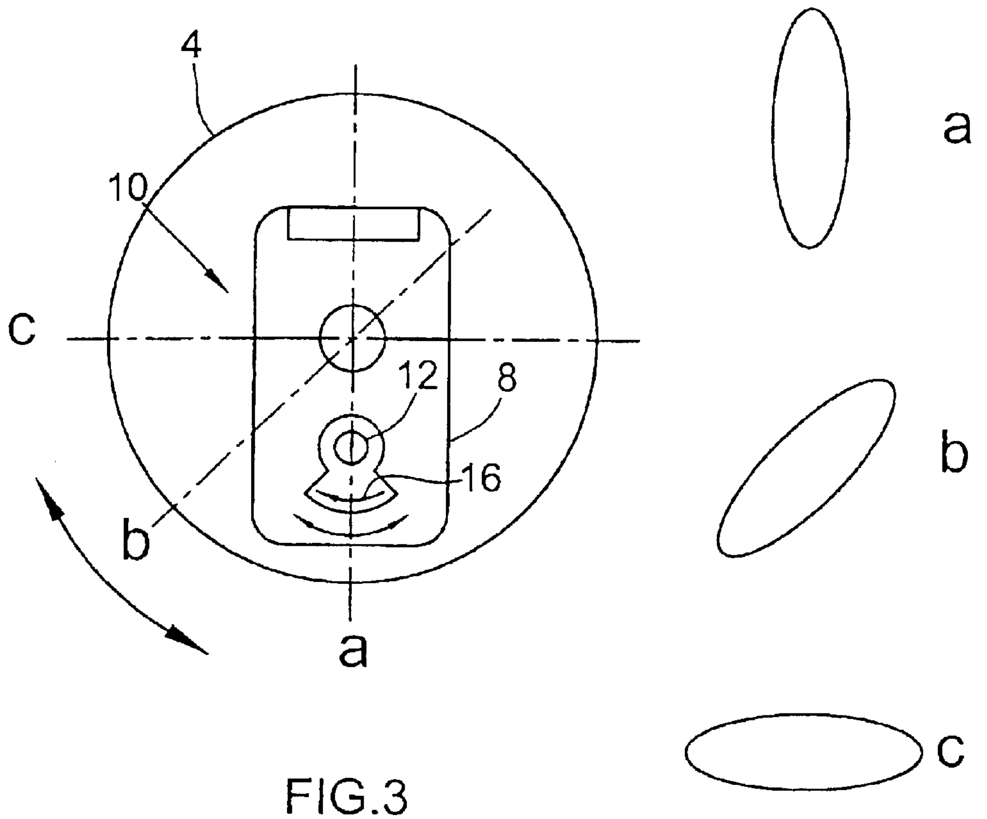
FIG. 3 shows a schematic representation of the angular positions of the pendulum-type vibrator with the respective forms of oscillation of the drum.

As can best be seen in FIG. 3, the pendulum-type housing 8 is infinitely adjustable by ±90° out of its vertical rest position with the aid of the adjusting means 5.

At least one unbalance weight 16 is fastened to an unbalance exciter shaft and generates centrifugal forces when being rotated, the amount of the centrifugal forces depending on the amount of the unbalance and the speed of the exciter shaft. The centrifugal forces act in each direction with the same intensity.

The unbalance exciter shaft 12 is supported in a pendulum-type housing 8 which, in turn, is suspended in parallel to the unbalance exciter shaft 12 such that it oscillates about the drum center axis 2. Owing to this pendulous suspension of the pendulum-type housing 8 centrifugal forces can be completely transmitted only in the direction of the unbalance exciter shaft/center of the drum axis. Forces extending perpendicularly to this plane effect an excursion of the pendulum-type housing out of its rest position (pendular oscillation).

The weight of the pendulum-type vibrator 10 must be pivoted against its inertia about the drum axis 2. This produces reaction forces in the drum axis 2 which act orthogonally to the aforementioned directly transmitted centrifugal forces.

The force components directly transmitted from the unbalance exciter shaft to the drum axis and the force components acting orthogonally to the former forces generate the elliptic oscillation of the drum.

The amount of the forces acting transversely to the main oscillation plane (exciter shaft—drum axis) depends on the position of the center of gravity of the pendulum-type housing and the distance between the unbalance exciter shaft 12 and the center of the drum and/or the pendulum suspension.

Thus, the configuration allows a circular oscillation to be generated in the drum when the distance between the exciter shaft and the drum axis 2 and/or between the center of gravity of the pendulum-type housing and the center of the drum is zero. An approximately straight line is produced when the distances tend towards infinite.

By suitably selecting the distances a more or less flat oscillation ellipse can be generated. This can be proved both mathematically and experimentally.

The position of the oscillation ellipse is adjustable using the adjusting means 5 with the aid of which the angular position of the oscillating pendulum-type housing 8 can be changed.

FIG. 3 shows three angular positions of the pendulum-type housing 8 designated a, b and c, and the respective drum oscillations. Position a shows the vertical position of the pendulum-type vibrator 10 with an elliptic drum oscillation whose main axis extends vertically. In position b of the pendulum-type housing 8 a drum oscillation is generated whose main axis extends at an angle of e.g. 45° relative to the vertical line. Finally, the pendulum-type housing can be pivoted by an angle of 90°, whereby an elliptical drum oscillation can be adjusted at which the main axis extends horizontally.

Any position between the angular positions a,b,c is adjustable.

The force components of the unbalance weights 16 extending at an angle relative to the longitudinal axis of the pendulum-type housing generate a momentum about the pivoting axis of the pendulum-type housing 8, which extends coaxially to the drum axis 2, thus effecting an excursion of the pendulum-type housing 8. Due to the high frequency of the unbalance weights 16 and the mass inertia of the pendulum-type housing 8 and due to provision of the damping element 20 the angle of the pendulum-type housing oscillation can be kept small. For example, the pendulum-type housing 8 oscillates or vibrates by ±3° relative to the angular position adjusted with the aid of the adjusting means 5 as the center position.

The direction of oscillation which is optimum with regard to the compacting intensity can be achieved by measuring the form of oscillation during the compacting process. The change in the form of oscillation occurring with increasing compaction of the subsoil as compared with the oscillation in uncompacted subsoil represents a measured value of compaction. This measured value serves as a reference variable input for control of the direction of oscillation. For example, in uncompacted subsoil the angular position a is selected, whereas position c can be selected after completion of the compacting process. The road roller 1 can thus be adapted to the subsoil conditions. The adjusting means 5 can be automatically actuated or manually controlled. During automatic operation the form of oscillation and/or the change in the elliptic oscillation movement of the roller drum is monitored. During the travel of the road roller 1 the quality of the subsoil is determined by oscillation analysis. The results of the oscillation analysis can be used to carry out automatic adjustment of the direction of oscillation via machine control. In this connection, speed control can be performed for the unbalance exciter shaft 12 via the hydrostatic oscillation drive 6.

Although a preferred embodiment of the invention has been specifically illustrated and described herein, it is to be understood that minor variations may be made in the apparatus without departing from the spirit and scope of the invention, as defined by the appended claims.

What is claimed is:

1. Compactor comprising at least one traveling drum, (4,4*a*,4*b*)) rotatable about a drum axis (2), an oscillation exciter supported in the drum (4,4*a*, 4*b*), the angular position of the oscillation exciter being adjustable by an adjustable pivoting angle relative to a vertical plane extending through the drum axis (2), characterized in that the oscillation exciter comprises a pendulum-type vibrator (10), the pen-dulum-type vibrator comprises a pendulum-type housing (8) which is pivotable about a pivoting axis extending coaxially to the drum axis (2) wherein the pendulum-type housing includes a single unbalance exciter shaft (12) supported at a radial parallel distance to the drum axis (2) in the pendulum-type housing (8), and the pendulum-type housing (8) oscillates about the adjusted angular position, wherein the pendulum-type vibrator (10) generates an elliptic drum oscillation in the respective angular position of the pendulum-type vibrator (10).

2. Compactor according to claim 1, characterized in that the pendulum-type housing is supported coaxially to the drum axis (2).

3. Compactor according to one of claims 1 or 2, characterized in that the pendulum-type housing (8) has a moment of inertia which counteracts the torque about the pivoting axis of the pendulum-type housing resulting from at least one rotating unbalance weight (16) to generate an elliptic form of oscillation of the drum (4,4*a*,4*b*).

4. Compactor according to one of claims 1 to 3, characterized in that the pendulum-type housing (8) is radially supported via rolling bearings (30) inside the drum (4,4*a*, 4*b*).

5. Compactor according to claim 1, characterized in that between an adjusting means (5) for adjusting the angular position of the pendulum-type vibrator (10) relative to the vertical plane extending through the drum axis (2) and the pendulum-type housing (8), damping elements (20) permitting pendular oscillations of the pendulum-type housing (8) are arranged.

6. Compactor according to claim 1, characterized in that the intensity of compaction is variable through the elliptic oscillation via the angular position of the pendulum-type housing (8) and the speed of the unbalance exciter shaft (12).

7. Compactor according to claim 1 characterized in that a drive shaft (22) of the pendulum-type vibrator (10) is arranged coaxially to the drum axis (2) and supported in the pendulum-type housing (8).

8. Compactor according to claim 7, characterized in that the drive shaft (22) for the pendulum-type vibrator (10) is coupled via an intermediate gear with the unbalance exciter shaft (12).

9. Compactor according to claim 8, characterized in that the intermediate gear comprises a belt drive (24).

10. Compactor according to claim 1, characterized in that the unbalance exciter shaft (12) is adapted to be directly electrically or hydrostatically driven.

11. Compactor according to claim 1, characterized in that, in axial direction, two drums (4, 4*a*, 4*b*) are arranged side by side and comprise a common pendulum-type vibrator (10).

12. Compactor according to claim 1, characterized in that a measuring means monitors the change in the elliptic form of oscillation during a compaction process and controls, in dependence on the result of an oscillation analysis, the angular position of the pendulum-type vibrator (10) via machine control and thus the amplitude of the oscillation acting upon the subsoil.

13. Compactor according to claim 2, characterized in that the pendulum-type housing (8) has a moment of inertia which counteracts the torque about the pivoting axis of the pendulum-type housing resulting from at least one rotating unbalanced weight (16) to generate an elliptic form of oscillation of the drum (4, 4*a*, 4*b*).

* * * * *